United States Patent
Elwakil

(10) Patent No.: US 6,231,654 B1
(45) Date of Patent: *May 15, 2001

(54) INK COMPOSITION AND A METHOD OF MAKING THE INK COMPOSITION

(75) Inventor: Hamdy A. Elwakil, Chanhassen, MN (US)

(73) Assignee: MacDermid Acumen, Inc., Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/303,280

(22) Filed: Apr. 30, 1999

(51) Int. Cl.⁷ .................................................. C09D 11/02
(52) U.S. Cl. ................................. 106/31.47; 106/31.49; 106/31.77; 106/31.78; 106/31.58; 106/31.86
(58) Field of Search ............................ 106/31.47, 31.49, 106/31.58, 31.77, 31.78, 31.86

(56) References Cited

U.S. PATENT DOCUMENTS

| | | | |
|---|---|---|---|
| 3,870,528 | * 3/1975 | Edds et al. | 106/31.47 |
| 3,903,034 | 9/1975 | Zabiak et al. | 260/29.6 WB |
| 4,325,735 | * 4/1982 | Ohta et al. | 106/31.47 |
| 4,391,639 | * 7/1983 | Kobayashi | 106/31.58 |
| 4,446,470 | * 5/1984 | Sugiyama et al. | 106/31.47 |
| 4,601,756 | * 7/1986 | Chiba et al. | 106/31.27 |
| 4,627,875 | 12/1986 | Kobayashi et al. | 106/22 |
| 4,683,002 | 7/1987 | Miura et al. | 106/20 |
| 4,864,324 | 9/1989 | Shirota et al. | 346/1.1 |
| 5,085,698 | 2/1992 | Ma et al. | 106/20 |
| 5,114,477 | 5/1992 | Mort et al. | 106/20 |
| 5,145,518 | 9/1992 | Winnik et al. | 106/21 |
| 5,156,675 | 10/1992 | Breton et al. | 106/22 |
| 5,205,861 | * 4/1993 | Matrick | 106/31.47 |
| 5,207,825 | 5/1993 | Schwarz, Jr. | 106/22 R |
| 5,242,489 | 9/1993 | Schwarz, Jr. | 106/20 D |
| 5,286,286 | 2/1994 | Winnik et al. | 106/21 A |
| 5,316,575 | * 5/1994 | Lent et al. | 106/31.6 |
| 5,376,169 | * 12/1994 | Hotomi et al. | 106/31.77 |
| 5,416,145 | 5/1995 | Askeland et al. | 524/190 |
| 5,484,475 | 1/1996 | Breton et al. | 106/20 C |
| 5,531,818 | 7/1996 | Lin et al. | 106/23 C |
| 5,542,970 | * 8/1996 | Miura et al. | 106/31.47 |
| 5,560,770 | * 10/1996 | Yatake | 106/31.58 |
| 5,616,174 | 4/1997 | Kanaya et al. | 106/22 K |
| 5,644,350 | 7/1997 | Ando et al. | 347/101 |
| 5,667,569 | 9/1997 | Fujioka | 106/31.58 |
| 5,674,314 | 10/1997 | Auslander et al. | 106/21 A |
| 5,679,142 | 10/1997 | McInerney et al. | 106/20 D |
| 5,681,380 | 10/1997 | Nohr et al. | 106/20 A |
| 5,681,381 | 10/1997 | Auslander et al. | 106/21 A |
| 5,714,538 | 2/1998 | Beach et al. | 524/504 |
| 5,719,204 | 2/1998 | Beach et al. | 523/161 |
| 5,746,817 | 5/1998 | Katsen et al. | 106/31.65 |
| 5,746,818 | 5/1998 | Yatake | 106/31.86 |
| 5,753,016 | 5/1998 | Hayashi et al. | 106/31.48 |
| 5,769,929 | 6/1998 | Gundlach et al. | 106/31.27 |
| 5,785,743 | 7/1998 | Adamic et al. | 106/31.27 |
| 5,803,958 | 9/1998 | Katsen et al. | 106/31.65 |
| 5,852,075 | 12/1998 | Held | 523/161 |
| 5,871,572 | 2/1999 | Marritt | 106/31.36 |
| 5,888,629 | 3/1999 | Lubar | 428/212 |

\* cited by examiner

*Primary Examiner*—Helene Klemanski
(74) *Attorney, Agent, or Firm*—Kinney & Lange, P.A.

(57) ABSTRACT

A method of forming a printing ink, the method including combining a nitrogen-containing cyclic organic compound, a glycol ether or a glycol ether acetate, and a colorant; and homogeneously blending the nitrogen-containing cyclic organic compound, the glycol ether or the glycol ether acetate, and the colorant to form the ink jet printing ink.

66 Claims, No Drawings

INK COMPOSITION AND A METHOD OF MAKING THE INK COMPOSITION

BACKGROUND OF THE INVENTION

The present invention generally relates to an ink composition and to a method of making the ink composition. More specifically, the present invention relates to an ink composition that may be used in ink jet printing and to a method of making this ink composition. The present invention further relates to a method of printing the ink composition on a variety of recording media, such as fibrous recording media, porous recording media, and hydrophobic recording media.

Ink jet printing is a non-impact printing process in which ink droplets are formed and thereafter deposited on a print medium in a particular order to form an image on the print medium. The low cost and high quality of the printed output in combination with the relatively noise-free operation of ink jet printers have made ink jet printing a popular and economical alternative to other types of printing in consumer, office, and industrial settings.

Ink jet printing generally involves the creation and ejection of tiny droplets of ink. There are a number of different techniques currently available for creating and ejecting the ink droplets, such as thermal ink jet, piezoelectric ink jet, acoustic ink jet, and vibrating ink jet systems. Each of these types of ink jet systems are known as drop-on-demand systems. Besides drop-on-demand systems, there are also continuous stream ink jet printing systems.

In continuous stream ink jet systems, ink is emitted in a continuous stream under pressure through at least one orifice or nozzle. The stream is broken up into droplets at a fixed distance from the orifice. The individual droplets are thereafter charged and directed toward the recording medium or are recycled into the printing ink supply. In drop-on-demand systems, an ink droplet is not formed or expelled from the printer head unless the droplet is to be placed on the recording medium. Therefore, since drop-on-demand systems require no ink recovery or post-ejection treatment, drop-on-demand systems are typically somewhat simpler in construction and operation than continuous stream ink jet printing systems.

The most common types of drop-on-demand ink jet printing systems are thermal ink jet (also known as "bubble jet") systems and piezoelectric ink jet systems. In thermal ink jet printing, the energy for drop formation and ejection is generated by electrically heated resistor elements. The resistor elements heat up rapidly in response to electrical signals from a microprocessor to create a vapor bubble. Superheating of the ink far above the normal boiling point of the ink causes the bubble formation. The expansion of the bubble forces a droplet of ink out of a nozzle at a higher rate of speed toward the recording medium. After the collapse of the bubble, the ink channel proximate the resistor element refills by capillary action.

In the piezoelectric ink jet printing system, electric signals generated by a microprocessor cause vibration of piezoelectric crystals in the printer head. The vibration of the piezoelectric crystal causes formation and ejection of ink droplets from the nozzle of the piezoelectric ink jet printer head. As with thermal ink jet printing, the ink channel of the piezoelectric inkjet printer refills by capillary action after ejection of each discrete bubble.

The viscosity and surface tension of the ink used in thermal and piezoelectric ink jet printing systems directly correlates to the ability of capillary action to quickly refill the print head after ejection of each ink droplet. The optimum combination of surface tension and viscosity varies between different print heads due to varying materials of construction and varying dimensions between different print heads.

Colorants for inks printed by ink jet printing are available in the form of dyes or pigments. Accordingly, ink jet printer inks may incorporate dye(s), pigment(s), or a combination of dye(s) and pigment(s). Of these three, dye-based ink jet printer ink compositions are most widely available commercially.

Most dye-based ink jet printer ink compositions are water based and are formed by dissolving dye in an aqueous carrier or ink vehicle. Ink compositions containing water-soluble dyes are problematic for at least a couple of reasons. First, printed images formed from ink containing water-based dyes typically do not exhibit adequate water-fastness, absent incorporation of dye stabilizers in the ink composition or application of a protective coating over the printed image. Each of these protective measures add cost to the printing process and may slow the printing process. Secondly, water-based ink jet printing compositions containing water-soluble dyes are typically not suitable for use on hydrophobic recording media, such as untreated vinyl media or hydrophilic recording media that has been sized with a hydrophobic sizing agent.

As an alternative to dye-based ink jet printing inks, pigment-based ink jet printing inks may be prepared. Pigments offer the very desirable properties of enhanced water fastness and enhanced light fastness, such as enhanced resistance to degradation by ultraviolet radiation, compared to water-soluble dyes. However, careful precautions must be taken to attain a uniform pigment size particle distribution and to prevent pigment agglomeration in the ink jet composition. Furthermore, pigment particles, unlike dye molecules, are typically not chemically bound within the printed image or to the recording media.

Very little attention has been given to formulation of ink jet printing ink compositions that are suitable for use on hydrophobic recording media, such as untreated vinyl, or hydrophilic media that has been sized with a hydrophobic sizing agent. Hydrophobic media is particularly useful for outdoor applications, such as billboards, and other types of signage or printed media, outdoor or otherwise, that is exposed to water, such as rainfall or other types of precipitation. The potential for outdoor exposure of images printed on hydrophobic media to precipitation, ultraviolet radiation from the sun, and relatively large temperature variations requires that images printed on hydrophobic media have high levels of waterfastness and lightfastness and additionally requires the printed images to be highly abrasion resistant.

There are presently no available ink compositions that provide the capability of incorporating either dye, pigment, or combinations of dye and pigment, while permitting printed images based upon the ink composition to exhibit a high degree of waterfastness, a high degree of lightfastness, quick drying attributes, and high abrasion resistance. Though some inks are capable of ultimately meeting these requirements, these inks require post-treatment, such as heat treatment or ultraviolet radiation treatment, and thereby do not exhibit the requisite quick drying attributes, standing alone. Furthermore, presently available inks are typically not suitable for use with hydrophobic recording media that is most useful for outdoor applications. Thus, a need exists for an ink jet composition that may incorporate either dye or pigment and that forms a highly lightfast, highly waterfast, highly abrasion resistant, quick drying image when applied via ink jet printing on recording media, such as hydrophobic recording media.

BRIEF SUMMARY OF THE INVENTION

The present invention includes a method of forming a printing ink that entails combining a nitrogen-containing cyclic organic compound, a glycol ether or a glycol ether acetate, and a colorant; and homogeneously blending the nitrogen-containing cyclic organic compound, the glycol ether or the glycol ether acetate, and the colorant to form the ink jet printing ink. The present invention further include a printing ink, an ink jet printing ink, and a method of forming an ink jet printing ink.

DETAILED DESCRIPTION

The present invention generally relates to an ink composition and to a method of making the ink composition. More specifically, the present invention relates to an ink composition that may be used in ink jet printing and to a method of making this ink composition. The benefits of the ink composition of the present invention are particularly evident when the inventive ink is printed on hydrophobic recording media.

The inventive ink composition may generally include 0 weight percent to about 10 weight percent water; about 10 weight percent to about 99.5 weight percent of a nitrogen-containing cyclic organic compound; 0 weight percent to about 80 weight percent of glycol ether, glycol ether acetate, or any combination of glycol ether and glycol ether acetate; 0 weight percent to about 10 weight percent of dye, pigment, or any combination of dye and pigment; 0 weight percent to about 1.5 weight percent of ultraviolet inhibitor, and 0 weight percent to about 1.5 weight percent of ultraviolet absorber. Unless otherwise specified, all expressions of weight percent are based on the total weight of the ink composition.

The ink composition of the present invention may generally be applied to any naturally-occurring or synthetic hydrophobic recording media. The nitrogen-containing cyclic organic compound component of the inventive ink, upon contact with any hydrophobic polymeric material of hydrophobic recording media dissolves the contacted hydrophobic polymeric material of the hydrophobic recording media and, upon drying of the inventive ink, facilitates bonding of the ink droplets to the hydrophobic polymeric material of the recording material.

The hydrophobic recording media may be formed of any hydrophobic polymeric material, such as vinyl polymers and copolymers; acetylated cellulose; cellulose ethers having an ethoxyl degree of substitution between about 2.0 and about 3.0, such as ethyl cellulose olefin polymers and copolymers; polyamide (i.e. nylon); polyester; polyketones, acrylic polymers and copolymers, and any combination of these. Some suitable examples of hydrophobic vinyl polymers include polyvinylbutyral, such as S-LEC BL-3 polyvinylbutyral that is available from Sekisui Chemical Co. Ltd. of Japan; and polyvinyl formal. Also, the hydrophobic recording media may be any of the vinyl-based print recording products available from Avery Dennison Corporation of Pasadena, Calif. Some suitable examples of hydrophobic polyolefins include polyethylene and polypropylene. In addition, the ink composition of the present invention may be beneficially applied to recording media that has been coated with hydrophobic material, such as any of the hydrophobic polymeric materials listed above. Furthermore, the hydrophobic recording media may be formed of any inorganic hydrophobic substrate.

The ink composition of the present invention may also be beneficially applied to any hydrophilic recording media that has been impregnated with an amount of any hydrophobic material that is effective to transform the recording media into hydrophobic recording media despite the partial hydrophilic nature of the recording media. For example, the recording media could be formed of a combination of hydrophilic and hydrophobic polymeric resins such as a combination of polyvinyl pyrrolidone/dimethylaminoethylmethacrylate (PVP copolymer), which is a hydrophilic polymeric resin, and ethyl cellulose, a hydrophobic polymeric resin. The PVP copolymer is available as COPOLYMER 958 that is available from International Specialty Products of Wayne, N.J. Ethyl cellulose, which is available as ETHOCEL® STANDARD GRADE from Del Chemical USA of Midland, Mich., is one example of a suitable hydrophobic cellulose ether polymer. The ratio of hydrophobic cellulose ether polymer to hydrophilic water soluble polymer may range from approximately 0.1:1 to approximately 1:1 by weight.

The ink of the present invention may also be beneficially applied to fibrous and porous recording media that is either hydrophobic or hydrophilic. Droplets of the ink penetrate between fibers of the fibrous recording media and penetrate into the pores of the porous recording media. The ink then quickly dries and either becomes physically entrapped between the fibers of the fibrous recording media or in the pores of the porous recording media when the fibrous or porous recording media is hydrophilic. Alternatively, when the fibrous or porous recording media is hydrophobic or is coated with hydrophobic polymeric material, the nitrogen-containing cyclic organic compound component of the inventive ink facilitates bonding of the ink droplets to the fibrous or porous recording media, as explained above in relation to hydrophobic recording media. Additionally, some physical entrapment of the ink droplets is believed to occur between the fibers of the fibrous recording media or in the pores of the porous recording media, even when the fibrous or porous recording media is or contains hydrophobic polymeric material.

The fibrous or porous recording media may be formed of any fibrous or porous form of the aforementioned hydrophobic materials. Additionally, the fibrous or porous recording media may be formed of or incorporate any fibrous or porous hydrophillic or hydrophobic material, such as, for example, cotton, cellulose, rayon, wool, silk, and wood.

The hydrophobic, fibrous, or porous recording media, recognizing that the fibrous or porous recording media may be hydrophilic, hydrophobic, or anywhere on the continuum between hydrophilic and hydrophobic, may take any form such as the form of a web or a sheet, such as a web or sheet of paper; packaging material; or textile material such as fabric, cloth, or canvas. Additionally, the hydrophobic recording media may be either flat or have a curved surface or surfaces.

When used in thermal ink jet printers, the inks of the present invention may generally have a surface tension ranging from about 28 dynes/cm to about 40 dynes/cm at 25° C. and may generally have a Brookfield viscosity ranging from about 2 centipoise to about 8 centipoise at 25° C. When used in thermal ink jet printers, the surface tension of the inventive ink composition preferably ranges from about 32 dynes/cm to about 40 dynes/cm 25° C. and the Brookfield viscosity preferably ranges from about 3 centipoise to about 6 centipoise at 25° C. When used in non-thermal ink jet printers, such as piezoelectric, acoustic, vibratory, or continuous ink jet printers, the inks of the present invention may generally have a surface tension ranging from about 28 dynes/cm to about 40 dynes/cm at 25° C. and may generally have a Brookfield viscosity ranging from about 2 centipoise up to about 50 centipoise at 25° C.

The optimum combination of surface tension and viscosity for the ink composition of the present invention varies depending upon the particular ink jet print head or cartridge being used, since commercially available print heads and cartridges are formed of a variety of different materials and have different dimensions, especially in the nozzles of the various ink jet print heads and cartridges. Those of ordinary skill in the art of ink jet printing would be capable of recognizing and determining the appropriate combination of ink viscosity range and ink surface tension range appropriate for a particular ink jet print head or cartridge, would be capable of modifying the concentration of the components of the inventive ink to fall within this combination of appropriate ranges, and would therefore be capable of accommodating the ink of the present invention in any thermal ink jet print cartridge or non-thermal ink jet print head.

The ink composition of the present invention exhibits very good drying characteristics in that it has been found that no post-treatment, such as heat treatment or ultraviolet treatment, is necessary to obtain very quick drying times for the applied ink droplets of about one second or less, even when the ink droplets are applied onto hydrophobic material. Preferably, the ink composition exhibits a drying time without post-treatment of about ½ second or less and still more preferably of about 1/10 second or less. The term "drying" refers to the solidification of the applied ink droplet from the liquid form. Drying of an applied droplet of the inventive ink may be considered to have occurred and be complete when the applied ink droplet is incapable of being smeared with a person's finger. The drying may occur by evaporation of liquid vehicular portions of the ink, by absorption of liquid vehicle portions of the ink into the recording media, or by a combination of liquid vehicle evaporation and absorption. The ink composition of the present invention also exhibits no or essentially no fluid movement after application to the recording media, since it has been observed that the applied ink droplets do not drip and tend to spread only minimally, if at all, when applied to the recording media.

The ink composition has also been found to be thermally stable during application via ink jet print cartridges and, after being printed onto recording media, during exposure to elevated temperatures when the printed image is on display. During printing, for example, when applied by a thermal ink jet printer in which the ink composition may be heated to temperatures of about 280° C. or greater, it has been found that the ink composition does not perceptibly degrade and produces a good image when applied to the recording media. Of course, thermal stability is less important in ink jet printers of the type other than thermal ink jet printers, since other types of ink jet printers, such as piezoelectric ink jet printers, do not subject the ink to high temperatures such as those present in thermal ink jet printers. Additionally, once applied to the recording media, the ink composition of the present invention is thermally stable at temperatures typically seen in outdoor environments or in display case environments. For example, the printed images formed of the inventive ink composition, such as printed images of outdoor billboards, do not visibly degrade in color or form when subjected to high outdoor temperatures caused by direct exposure of the printed images to sunlight. As another example, the printed images formed of the inventive ink composition do not visibly degrade in color or form when subjected to high temperatures in lighted display cases, such as that caused by exposure to hot light bulbs that are in close proximity to the printed image in lighted display cases.

Additionally, the ink composition of the present invention is stable against ultraviolet radiation such that printed images formed of the inventive ink do not visibly fade or change color when subjected to ongoing ultraviolet radiation exposure, such as that stemming from exposure to sunlight. Finally, the printed images formed of the inventive ink are highly crack resistant and highly abrasion resistant. This is important, especially in outdoor environments, where even extreme temperature changes from about −40° F. to about 120° F. or more will not cause printed images formed of the inventive ink to crack or otherwise degrade. The high degree of abrasion resistance permits printed images exposed to abrasive forces, such as pelting rains, hail, and ice pellets, to remain as originally printed without perceptible degradation.

The water that may be used in forming the ink of the present invention is preferably steam distilled water containing little if any impurities, such as inorganic material (i.e., mineral), and consequently also has little if any electrical conductivity. The low mineral content and low conductivity are important to support long term use of ink jet printer cartridges with the ink of the present invention. The dimensional tolerances within ink jet print cartridges are very small, such as on the order of a fraction of a micron, especially in the nozzles of the printer cartridges. Mineral deposits within ink jet print cartridges will quickly degrade print cartridge performance. This is especially true with respect to thermal ink jet printers, where caking of mineral deposits on the resistor element will prevent proper heating of the ink and will thereby prevent proper bubble formation. Besides any water included in the ink composition of the present invention, all other components of the ink composition also preferably contain little, if any, mineral content, and consequently exhibit little if any electrical conductivity, especially when the inventive ink is to be used in thermal ink jet printing.

The nitrogen-containing cyclic organic compound of the inventive ink has been found to improve the water resistance of the printed image, the visual quality of the printed image, and the solution stability of the colorant in the ink prior to printing. Additionally, the nitrogen-containing cyclic organic compound component of the inventive ink, upon contact with any hydrophobic polymeric material of hydrophobic recording media dissolves the contacted hydrophobic polymeric material of the hydrophobic recording media and, upon drying of the inventive ink, facilitates bonding of the ink droplets to the hydrophobic polymeric material of the recording material. Some examples of suitable nitrogen-containing cyclic organic compounds in accordance with the present invention include imidazolidinones, such as 1,3-dimethyl-2-imidazolidinone, pyrrolidones, caprolactams such as ε-caprolactam, and any of these in any combination. Some examples of suitable pyrrolidones include N-methyl-2-pyrrolidone, 2-pyrrolidone, N-cyclohexylpyrrolidone, 1-(2-hydroxyethyl)-2-pyrrolidone, N-vinyl-2-pyrrolidone, N-octyl-2-pyrrolidone, N-dodecyl-2-pyrrolidone, and any of these in any combination. Of these pyrrolidones, N-methyl-2-pyrrolidone is preferred, especially when the inventive ink is to be used in thermal ink jet printing, since n-methyl-2-pyrrolidone has one of the lowest viscosities of the various nitrogen-containing cyclic organic compounds and therefore helps make it possible to attain the Brookfield viscosity ranging from about 2 centipoise to about 8 centipoise at 25° C. for the form of the inventive ink that is destined for use in thermal ink jet printing.

Some general examples glycol ethers and glycol ether acetates that may be included in the inventive ink include ethylene glycol mono-alkyl ethers, diethylene glycol mono-alkyl ethers, triethylene glycol mono-alkyl ethers, propylene glycol mono-alkyl ethers, dipropylene glycol mono-alkyl ethers, tripropylene glycol mono-alkyl ethers, acetates of any of these glycol ethers, and any of these glycol ethers or glycol ether acetates in any combination. More preferably, the mono-alkyl portion of these glycol ethers and glycol ether acetates is mono$C_{1-6}$alkyl. Some preferred forms of glycol ether and glycol ether acetate include propylene glycol methyl ether (PM), dipropylene glycol methyl ether (DPM), tripropylene glycol methyl ether (TPM), propylene glycol methyl ether acetate (PMA), dipropylene glycol methyl ether acetate (DPMA), dipropylene glycol n-butyl ether (DPnB), and dipropylene glycol n-propyl ether (DPnP). Still more preferably, the glycol ether or glycol ether acetate component of the inventive ink consists of dipropylene glycol methyl ether acetate, propylene glycol methyl ether acetate or any blend of dipropylene glycol methyl ether acetate and propylene glycol methyl ether acetate. Most preferably, the glycol ether or glycol ether acetate component of the inventive ink consists of dipropylene glycol methyl ether acetate.

The glycol ether or glycol ether acetate component is important to the ink of the present invention, since it has been found that the glycol ether or glycol ether acetate component helps to slow down drying of the ink on hydrophobic polymeric recording media, such as vinyl based recording media, and thereby helps to minimize, and preferably eliminate banding of the printed ink image. As print resolution increases and printed dot size decreases, it is increasingly important that the printed dots spread, to some extent, to cover portions of the recording media not contacted by the printed ink droplets upon initial contact of the printed ink droplets with the printed media. If sufficient spreading of the ink dots does not occur, portions of the recording media, within a portion of the printed image that is to appear visually as a continuous printed image, may appear visual to have non-printed gaps. These visually apparent, non-printed gaps constitute banding, which is undesirable when the printed image is desired to be visually seen as a continuous printed image.

Additionally, the glycol ether or glycol ether acetate component, upon contact with any hydrophobic polymeric material of the recording media, acts as a penetrant that helps to dissolve the contacted hydrophobic polymeric material of the recording media and better permit printed ink droplets to penetrate and bond with the hydrophobic polymeric material of the recording medium. Furthermore, the glycol ether or glycol ether acetate component, when used in combination with water and the nitrogen-containing cyclic organic compound, such as pyrrolidone, has been found to greatly reduce or eliminate any destructive effect of water/pyrrolidone, such as swelling or solvation of polymeric components of ink jet print heads and erosion and corrosion of metal components of ink jet print heads. Therefore, the glycol ether or glycol ether acetate component is important in the inventive ink composition to minimize or eliminate the aggressive nature of water/pyrrolidone mixtures that would otherwise exist absent the added glycol ether or glycol ether acetate.

When the inventive ink is used in thermal ink jet printing, the water serves as the propellant of the ink in the thermal ink jet printer. As the propellant, the water is the component of the ink that supports formation and subsequent collapse of the vapor bubble that causes ejection of ink droplets from the nozzles of the thermal ink jet printer. When a high boiling solvent, such as a pyrrolidone, is substituted in place of water, the ink is not consistently jettable in optimum form for long operating periods by thermal ink jet print heads, without periodic vacuum evacuation of the thermal ink jet print heads. It is believed that the vapor bubbles formed in the thermal ink jet print head when the high boiling solvent is fully substituted in place of the water as the propellant do not fully collapse and thereby, as printing progresses, diminish the ability of the print head to optimally eject ink droplets. Therefore, water is preferably included in the inventive ink composition to serve as the propellant when the ink is to be used in a thermal ink jet printer.

Nonetheless, it has been surprisingly discovered that a high boiling solvent, such as a pyrrolidone, may be substituted in place of water as the propellant while still printing acceptable images via thermal ink jet printing over short periods of printer operation. For example, when the inventive ink was formulated as a non-aqueous ink to include about 97.5 weight percent N-methyl-2-pyrrolidone and about 2.5 weight percent of a solvent dye, based on the total weight of the ink, it was found that the inventive ink produced acceptable printed images, having continuous printed areas ranging from up to about six square feet, on hydrophobic recording media, when the inventive non-aqueous ink was printed on hydrophobic recording media, such as vinyl recording media, using a C1806A thermal ink jet print cartridge, available from Hewlett-Packard Corp. of Palo Alto, Calif., in a DISPLAYMAKER® Series XII thermal ink jet printer that is available from ColorSpan Corporation of Eden Prairie, Minn. As printing progressed with the inventive non-aqueous ink, the applied density the ink in the printed image gradually decreased so that the printed image appeared visually to have reduced color density as viewer visually scanned the printed image from one end to another.

However, by periodically evacuating the thermal ink jet print head of the thermal ink jet printer using vacuum means, printing of images, having continuous printed areas of any square footage and print density with little or any visually perceptible variation, may occur when using the inventive non-aqueous ink for thermal ink jet printing, even over long printing periods lasting several minutes, hours, or days. An example of a suitable vacuum means for evacuating thermal ink jet print heads is a vacuum pump assembly, available from Hewlett Packard Corporation, that includes multiple plenums and a cam assembly which may be used to selectively connect the vacuum pump, one at a time, to multiple thermal ink jet print heads. Variations in print density within a printed image become less visually perceptible as the viewer is positioned farther and farther away from the printed image. Therefore, use of the inventive non-aqueous ink in thermal ink jet printing is particularly applicable for thermal ink jet printing of printed images, such as printed images of outdoor billboards, that will be viewed from longer distances on the order of several feet, such as about 10 feet or more, and preferably from still longer distances on the order of several yards, such as about 10 yards or more and more preferably about 30 yards or more. Nonetheless, water is preferably included in the inventive ink composition to serve as the propellant when the ink is to be used in a thermal ink jet printer, since the use of water as the propellant dispenses with the need to periodically evacuate the print head, when using the inventive ink in thermal ink jet printing, even when the ink is used in the thermal ink jet printer for longer printing periods lasting several minutes, hours, or even days.

Either dye or pigment may be included as colorant in the ink of the present invention. A "dye" is to be understood as meaning a colorant that is soluble or that becomes soluble at some point during the printing process. A "pigment" is to be understood as meaning a colorant that is insoluble (i.e., in particulate or crystalline form) throughout the printing process. The dye that is used in forming the ink composition may generally be any dye that is soluble in water or in a polar or non-polar organic solvent. Therefore, some examples of general types of suitable dyes include direct dyes, acid dyes, basic dyes, reactive dyes, food dyes, vat dyes, and solvent dyes. Water soluble dyes may be used even when water is excluded from the inventive ink, since water soluble dyes are typically quite soluble in the nitrogen-containing cyclic organic compound, due to the relatively polar nature of the nitrogen-containing cyclic organic compound.

Preferably, however, the dye is a solvent dye that is soluble in a polar organic solvent. These types of solvent dyes are preferred over water soluble dyes, since solvent dyes typically exhibit a much higher degree of waterfastness, as compared to water-soluble dyes, upon printing of the image on the recording media. Additionally, solvent dyes, as compared to water-soluble dyes, are more likely to be strongly bound chemically within the printed image and, upon contact with any hydrophobic polymeric material of the recording media, are more likely to be chemically bound to any contacted hydrophobic material of the recording media.

Some examples of generic names of suitable solvent dyes include: Basic Red 1, Basic Red 1:1, Basic Violet 11:1, Solvent Black 29, Solvent Red 160, Solvent Yellow 162, Cu Phthalocyanine, Solvent Yellow 81, Solvent Black 3, Solvent Violet 13, Solvent Red 195, Solvent Yellow 93, Acid Black 52, Acid Blue 260, Acid Red 407, Acid Yellow 220, Solvent Black 29, Solvent Blue 70, Solvent Blue 67, Solvent Red 122, Solvent Yellow 88, Solvent Black 27, Solvent Blue 104, Solvent Red 185, Solvent Yellow 96, Solvent Black 45, Solvent Blue 44, Solvent Red 124, Solvent Orange 41, Solvent Orange 62, Solvent Red 91, Solvent Yellow 83:1, Solvent Yellow 83, Solvent Yellow 88, Solvent Black 28, Solvent Black, Solvent Black 29, Cu Phthalocyanine, Solvent Red 119, Solvent Red 125, Solvent Red 127, Solvent Red 172, Solvent Yellow 90, Solvent Red 119, Solvent Blue 48, Solvent Black 27, and any of these in any combination.

Some examples of suitable dye products that are based upon suitable solvent dyes include BASONYL® Red 482, BASONYL® Red 485, BASONYL® Red 560, NEOPEN® Black 365, NEOPEN® Red 365, NEOPEN® Yellow 075, NEOZAPON® Blue 607, NEOZAPON® Yellow 141, NEOZAPON® Yellow NB 108, NEPTUN® X60, THERMOPLAST® Black X70, THERMOPLAST® Blue 684, THERMOPLAST® Red 454, and THERMOPLAST® Yellow 104 that are available from BASF Corporation of Mt. Olive, N.J.; Irgaperse Black RU, Irgaperse Blue 1614-U, Irgaperse Red GU, Irgaperse Yellow 2RU, ORASOL® Black RLI, ORASOL® Blue GL, ORASOL® Blue GN, ORASOL® Red BL, and ORASOL® Yellow 2GLN that are available from Ciba Geigy of Basel, Switzerland; Irgaperse Black RU, Irgaperse Blue 1614-U, Irgaperse Red GU, Irgaperse Yellow 2RU, ORASOL® Black RLI, ORASOL® Blue GL, ORASOL® Blue GN, ORASOL® Red BL, and ORASOL® Yellow 2GLN that are available from Clarient Corporation of Switzerland; INTRAPLAST® Yellow 2GLN, INTRAPLAST® Black CN, INTRAPLAST® Black M2N, INTRAPLAST® Black RLS, INTRAPLAST® Brill Blue GN, INTRAPLAST® Red 2BL, INTRAPLAST® Red GC, and INTRAPLAST® Pink 6BLG, that are available from Crompton & Knowles; 45-45 MORPLAS® Magenta 36,46-102 Navipon Yellow GL, 46-402 Navipon Fire Red G, 46-600 Navipon Blue 2GLN, and 46-602 Navipon Black RE that are available from Sunbelt; and any of these in any combination.

The pigment that may be used in the inventive ink may be either organic or inorganic in nature. It is beneficial if the pigment is supplied in either encapsulated form or as a part of a pigment dispersion Encapsulated pigment is not released from the encapsulating material until the pigment encapsulation is mixed with the solvent portion of the ink. The solvent breaks down the encapsulating material and thereby allows the fine pigment particles that were formerly encapsulated to disperse in the solvent. Encapsulated pigment thereby avoids the typical problem of dispersing the pigment by delaying pigment dispersion until after the encapsulated pigment is mixed with the solvent. Pigment dispersions comprise the pigment along with a polymeric dispersant. Some examples of polymeric dispersant used in commercially available pigment dispersions include glycols and glycol ethers. Additionally, the pigment dispersion may include stabilizers that further help to maintain dispersion of the pigment within the pigment dispersion.

Some examples of suitable pigments include carbon black, copper phthalocyanine, pigment yellow 17, pigment yellow 83, pigment yellow 93, pigment yellow 110, pigment yellow 151, pigment yellow 180, pigment red 146, pigment red 184, pigment red 208, quiacridone red 122, quiacridone red 202, quiacridone violet 19 and any these in any combination.

Some examples of suitable pigment dispersions that incorporate one or more of these suitable pigments include Black dispersion SE-1727, Black dispersion SE-1745, Blue dispersion SE-1726, Blue dispersion SE-1743, Magenta dispersion SE-1725, Magenta dispersion SE-1744, Yellow dispersion SE-1723, and yellow dispersion SE-1724, that are available from BASF Corporation of Mt. Olive, N.J.; MICROLITH® A\Black CA, MICROLITH® A\Blue 4GA, MICROLITH® A\Magenta 2BA, MICROLITH® A\Yellow 4GA, MICROLITH® k\Black CK, MICROLITH® k\Blue 4GK, MICROLITH® k\Magenta 5BK, and MICROLITH® k\Yellow 3RK, that are available from Ciba Geigy from Switzerland; and HANSA® Brill Yellow 5GX-03(11-2527), HOSTAPERM® Blue B2G (15-1020), HOSTAPERM® Green GC-A(16-2035), HOSTAPERM® Yellow H4G(11-3020), NOVAPERM® Red HF2B-01(13-3331), Permajet Blue B2G, Permajet Red E5B, Permajet Yellow H4G, RENOL® Black R-HW, RENOL® Blue B2G-HW, RENOL® Carmine FBB-HW, RENOL® Red HF2B-HW, RENOL Yellow HR-HW, Toner Yellow HG VP2155(11-3074), and Toner Magenta E02(13-7022) that are available from Clarient Corporation.

The ultraviolet inhibitor that is used in the ink of the present invention may include a hindered amine or a hindered amino ether compound. Some examples of suitable ultraviolet inhibitor products are TINUVIN® 123, TINUVIN® 292, TINUVIN® 144, TINUVIN® 622LD, and CHEMMASORB® 944FL that are available from Ciba Geigy of Switzerland. These ultraviolet inhibitors may be used individually or in any combination. The ultraviolet absorber that is used in the ink of the present invention may be based upon an unsubstituted or a substituted benzotriazole. Some examples of suitable ultraviolet absorber products include TINUVIN® 384, TINUVIN® 1130, TINUVIN® 900, TINUVIN® 328, and TINUVIN® P that are available from Ciba Geigy Corporation of Switzerland. These ultraviolet absorbers may be used individually or in any combination.

Ink produced in accordance with the present invention may be used in any type of printing technique, including, but not limited to, any type of ink jet printing, such as thermal ink jet printing and non-thermal ink jet printing. Some representative examples of thermal ink jet printing cartridges that may be suitably used for printing images of the ink of the present invention include any of the HERCULES series of thermal ink jet print cartridges, such as the C1806A, C1807A, C1808A, and C1809A thermal ink jet printing cartridges, that are available from that are available from Hewlett Packard Corporation of Palo Alto, Calif.; any of the MARGARITA series of thermal ink jet print cartridges, such as the C1892A, C1893A, C1894A, and C1895A thermal ink jet print cartridges, that are available from Hewlett Packard Corporation; and any of the 51626A, 51629, 51640, and 51645 thermal ink jet print cartridges, that are available from Hewlett Packard Corporation. Some representative examples of thermal ink jet printers that may be suitably used for printing images of the ink of the present invention using a thermal ink jet print cartridge, such any of the thermal ink jet print cartridges mentioned in the previous sentence, include the DISPLAYMAKER® Series XII thermal ink jet printer and the GICLÉE PRINTMAKER FA thermal ink jet printer that are each available from ColorSpan Corporation of Eden Prairie, Minn.

Furthermore, the present invention benefits from use in conjunction with an inventive ink jet print engine described, taught, and enabled in the following co-pending applications; namely, Ser. No. 09/303,489, entitled, "SOLVENT-BASED INK COMPOSITION FOR THERMAL INK JET PRINTING," which was filed on Apr. 30, 1999; and Ser. No. 09/303,787, entitled "DUAL PHASE INK COMPOSITION FOR THERMAL INK JET PRINTING ON VINYL AND FIBROUS PRINTING SUBSTRATES," which was filed on Apr. 30, 1999; each of which are commonly assigned with the present application and the contents of which are incorporated herein by reference in their entirety.

The formulation of the inventive ink may vary, depending upon the particular type of printing device the ink is to be used in. For example, the formulation of the inventive ink for use in a thermal ink jet printer, differs from the formulation of the ink for use in a non-thermal ink jet printer, such as a piezoelectric ink jet printer, due, for example, to the differing combination of ink viscosity and ink surface tension that may be required to permit a thermal ink jet printer to print the inventive ink versus the combination of ink viscosity and ink surface tension that may be required to permit a non-thermal ink jet printer to print the inventive ink.

In thermal ink jet printing, water, as previously explained, is included as a component of the ink to serve as a propellant in the thermal ink jet print head. The water is preferably included at a concentration that is sufficient to include a sufficient amount of propellant activity, for bubble formation, in the thermal ink jet ink composition. However, while including enough water as propellant, the water concentration is also limited on the upper end so that little if any water remains in the "as printed" form of the ink composition upon recording of the ink droplet on the recording media. In this scenario, the water that serves as a propellant is instantaneously evaporated upon expulsion of the ink droplet from the thermal ink jet print head nozzles. Preferably, the ink is formulated so that no, or essentially no, water remains in the ink droplets that are applied to the recording media. This minimization of water in the printed ink droplets helps to minimize the drying time of the printed droplets on the recorded media.

When used in thermal ink jet printing, and when the colorant is dye, the inventive ink preferably contains about 7.5 weight percent distilled water; about 44 weight percent N-methyl-2-pyrrolidone; about 45 weight percent dipropylene glycol methyl ether acetate; about 2 weight percent to about 3 weight percent solvent dye, when the dye is other than black, or about 2 weight percent to about 6 weight percent, when the dye is black; about 0.5 weight percent ultraviolet inhibitor; and about 0.5 weight percent ultraviolet absorber. When the ink is used in thermal ink jet printing and includes pigment as the colorant, the ink composition is preferably about 42.5 weight percent N-methyl-2-pyrrolidone, about 7.5 weight percent water, about 20 weight percent dipropylene glycol methyl ether acetate, and about 30 weight percent of any individual one of, or any combination of, any of the listed pigment dispersions available from BASF Corporation.

The composition of the inventive ink that is to be used in non-thermal ink jet printing, such as piezoelectric ink jet printing, is similar to the composition of the ink that is to be used in thermal ink jet printing, with the exception that water may be, and preferably, excluded from the ink composition. The water is preferably excluded when the ink is to be used in non-thermal ink jet printing, since the non-thermal ink jet printing process does not significantly heat the ink during the printing process and consequently does not cause evaporation of any significant amount of the water from the ink. Therefore, the printed ink droplet that is placed on the recording media contains substantially all of the water originally present in the ink when the printing occurred by non-thermal ink jet printing. This remaining water slows the drying process for the printed ink droplets significantly. Therefore, the water is preferably excluded from ink compositions printed by non-thermal ink jet printing.

When used in non-thermal ink jet printing, the ink composition of the present invention preferably includes about 10 weight percent to about 99.5 weight percent of the nitrogen-containing cyclic organic compound; 0 weight percent to about 80 weight percent of glycol ether, glycol ether acetate, or any combination of glycol ether and glycol ether acetate; 0 weight percent to about 20 weight percent of a viscosity control agent; 0 weight percent to about 10 weight percent of dye, pigment, or any combination of dye and pigment; 0 weight percent to about 1.5 weight percent of ultraviolet inhibitor, and 0 weight percent to about 1.5 weight percent of ultraviolet absorber. When used in non-thermal ink jet printing, and when the colorant is dye, the inventive ink more preferably contains about 40 weight percent to about 65 weight percent n-methyl-2-pyrrolidone; about 35 weight percent to about 50 weight percent dipropylene glycol methyl ether acetate; 0 weight percent to about 20 weight percent of the viscosity control agent; about 2 weight percent to about 3 weight percent solvent dye, when the dye is other than black, or about 2 weight percent to about 6 weight percent, when the dye is black; about 0.5 weight percent ultraviolet inhibitor; and about 0.5 weight percent ultraviolet absorber.

When the ink is used in non-thermal ink jet printing and includes pigment as the colorant, the ink composition preferably includes about 40 weight percent to about 65 weight percent n-methyl-2-pyrrolidone, about 15 weight percent to about 35 weight percent dipropylene glycol methyl ether acetate, about 15 weight percent to about 35 weight percent of any individual one of, or any combination of, any of the listed pigment dispersions available from BASF Corporation; and 0 weight percent to about 20 weight percent of the viscosity control agent. Encapsulated pigment may be used in inks destined for non-thermal ink yet printing. However, encapsulated pigments should not be used in the inventive ink when the ink is destined for thermal ink jet printing, since the encapsulating material is typically a film forming polymeric substance, such as a vinyl resin, that dissolves in the organic solvent of the ink and will reduce droplet jetting capabilities and eventually plug the thermal ink jet printer head. with any hydrophobic polymeric material of hydrophobic recording media dissolves the contacted hydrophobic polymeric material of the hydrophobic recording media and, upon drying of the inventive ink, facilitates bonding of the ink droplets to the hydrophobic polymeric material of the recording material.

The viscosity control agent may generally be any inorganic or organic substance that is compatible with the other components of the inventive ink, does not diminish the ability of the ink to maintain the desired concentration of dye in solution, does not diminish the ability of the ink to maintain dispersion of the desired concentration of pigment in the ink, is capable of permitting the inventive ink to attain the desired viscosity. Some examples of suitable viscosity control agents include maleic- and phenolic-modified rosin resins, such as UNI-REZ® resins that are available from Union Camp; PLUS-9114 plastisol thickener that is available from Union Ink Company of Ridgefield, N.J.; and Surfsperse Uni-Flo viscosity control agent that is available from SQG Industries of Fairfax, Ohio.

The technique of printing the inventive ink on hydrophobic polymeric material presents some special considerations. The nitrogen-containing cyclic organic compound component of the inventive ink, upon contact with any hydrophobic polymeric material of hydrophobic recording media dissolves the contacted hydrophobic polymeric material of the hydrophobic recording media. This interaction of the nitrogen-containing cyclic organic compound and the contacted hydrophobic polymeric material permits strong chemical bonding between components of the ink and the contacted hydrophobic polymeric material of the recording media. When the ink includes dye as the colorant, the ink exhibits a very high level of color fastness when the dye is soluble in the solvent portion of the ink, as opposed to being water soluble. Therefore, the dye used in the inventive ink is preferably soluble in the liquid organic components of the inventive ink.

When pigment is included as the colorant in the inventive ink, the surface porosity or fibrous nature of the recording media becomes more important since pigment particles, whether inorganic or organic in nature, do not typically bond to any significant degree with the recording media. Therefore, the recording media preferably has a substantial porosity or a substantially fibrous nature and the pigment particles preferably have a particle size distribution sufficient to permit a substantial amount, such as at least about 50 weight percent, and preferably at least about 80 weight percent, of the pigment particles contained in the ink to become impregnated and physically entrapped in pores or between fibers of the recording media. The porosity of the recording media, if not sufficient in the originally present recording material, may be enhanced by adding porosity agents, such as swelling agents, to the recording media prior to printing of the image using the ink of the present invention. Alternatively, or in addition to modifying the porosity of the hydrophobic recording media, fibers formed of hydrophobic polymeric resins, such as polyethylene, polypropylene, polyester, and polyamide, may be impregnated in the recording media to enhance the pigment particle entrapment capability of the recording medium.

When forming the ink of the present invention with dye as the only colorant of the ink, the various solvents such as any water; nitrogen-containing cyclic organic compounds such as pyrrolidone, and the glycol ether and/or glycol ether acetate are first mixed together to form a homogenous solvent mixture. Then, any of the viscosity control agent that is to be included in the ink is added to the homogeneous solvent mixture to form a thickened mixture. Then the dye may be added to the thickened mixture with mild agitation to fully place the dye in solution. Thereafter, the ultraviolet inhibitor and the ultraviolet absorber are blended in with mild agitation. When pigment is included, the same procedure is followed, except that the pigment, such as the encapsulated pigment or the pigment dispersion, is added after the ultraviolet inhibitor and the ultraviolet absorber are added to maximize the liquid content of the in-preparation ink composition prior to addition of the pigment.

When the ink composition includes solvent dye as the colorant, the ink should be filtered after preparation using a 0.4 micron polytetrafluroethylene (PTFE) filter to remove any impurities present in the solvent dye that is used. Solvent dyes are typically formed using a solvent crystallization technique. Since solvent dyes are traditionally not used in ink jet printing inks, these solvent dyes frequently have an undesirably high amount of impurities remaining following the solvent crystallization step. The step of filtering the inventive ink that contains dye is especially important when the ink is to be used in thermal ink jet printing, since the impurities in the solvent dye may plate on the resistor element in the thermal ink jet print head and thereby diminish performance of the thermal ink jet print head.

No particular precautions beyond those previously described are necessary when using the inventive ink for ink jet printing. Furthermore, since the ink compositions created in accordance with the present invention exhibit very fast drying times, no post-treatment of the printed images formed by droplets of the inventive ink, such as application of heat or ultraviolet radiation, is necessary to obtain the full benefits of the inventive ink.

Property Determination and Characterization Techniques

Viscosity

Unless otherwise indicated, all ink viscosities recited herein were determined in accordance with or are based upon the following procedure that uses a Brookfield Model DV-III programmable rheometer equipped with an adaptor for small samples. The Brookfield Model DV-III rheometer is available from Brookfield Engineering Laboratories, Inc. of Stoughton, Mass.

The viscosity (the "Brookfield viscosity") of a particular ink sample is determined with the ink sample at room temperature (about 25° C.). About 5 grams of the particular ink being tested are placed in the small sample adaptor which is positioned within the viscosity measurement cell of the rheometer. An appropriate spindle, identified by a spindle number and selected so that the measured viscosity is within the range of the particular spindle, is positioned within the small sample adaptor within the measurement cell. The Brookfield viscosity is measured while running the selected spindle at a revolution per minute (RPM) rate selected based upon calibration studies conducted at the direction of the inventor. For all viscosity determinations and specifications of this disclosure, Spindle No. 18 is selected and is rotated at about 225 RPM during viscosity determinations.

Surface Tension

Unless otherwise indicated, all surface tension values recited herein were determined with or are based upon use of the DuNOUY interfacial tensiometer that is available from CSC Scientific Company, Inc. of Fairfax, Va. using the surface tension measurement procedures set forth in the instructions accompanying the DuNOUY interfacial tensiometer. All surface tension values recited herein were determined at or are based upon an ink sample temperature of about 25° C.

Although the present invention has been described with reference to preferred embodiments, workers skilled in the art will recognize that changes may be made in form and detail without departing from the spirit and scope of the invention.

What is claimed is:

1. A method of forming a printing ink, the method comprising:
   combining water, a nitrogen-containing cyclic organic compound, and a colorant; and
   homogeneously blending the water, the nitrogen-containing cyclic organic compound, and the colorant to form the printing ink, the concentration of water in the printing ink ranging up to about 10 weight percent, based on the total weight of the printing ink.

2. The method of claim 1 wherein the nitrogen-containing cyclic organic compound is selected from the group consisting of an imidazolidinone, a pyrrolidone, a caprolactam, and any of these in any combination.

3. The method of claim 1 wherein the nitrogen-containing cyclic organic compound is selected from the group consisting of N-methyl-2-pyrrolidone, 2-pyrrolidone, N-cyclohexylpyrrolidone, 1-(2-hydroxyethyl)-2-pyrrolidone, N-vinyl-2-pyrrolidone, N-octyl-2-pyrrolidone, N-dodecyl-2-pyrrolidone, and any of these in any combination.

4. The method of claim 1 wherein the concentration of the nitrogen-containing cyclic organic compound in the ink is from about 10 weight percent to about 99.5 weight percent, based on the total weight of the ink.

5. The method of claim 1, the method further comprising:
   combining glycol ether or glycol ether acetate with the water, the nitrogen-containing cyclic organic compound, and the colorant; and
   homogeneously blending the nitrogen-containing cyclic organic compound, the glycol ether or the glycol ether acetate, the water, and the colorant to form the printing ink.

6. The method of claim 5 wherein:
   the concentration of the glycol ether in the ink is from 0 weight percent to about 80 weight percent, based on the total weight of the ink; and
   the concentration of the glycol ether acetate in the ink is from 0 weight percent to about 80 weight percent, based on the total weight of the ink.

7. The method of claim 1 wherein the nitrogen-containing cyclic organic compound is a caprolactam.

8. The method of claim 1 wherein the nitrogen-containing cyclic organic compound is selected from the group consisting of N-cyclohexylpyrrolidone, 1-(2-hydroxyethyl)-2-pyrrolidone, N-vinyl-2-pyrrolidone, N-octyl-2-pyrrolidone, N-dodecyl-2-pyrrolidone, or any of these in any combination.

9. The method of claim 1 wherein the printing ink consists essentially of the water, the nitrogen-containing cyclic organic compound, and the colorant.

10. The method of claim 1 wherein the concentration of water in the printing ink ranges up to about 7.5 weight percent, based on the total weight of the printing ink.

11. The method of claim 5 wherein the printing ink consists essentially of:
   the water, the nitrogen-containing cyclic organic compound, and the colorant; and
   the glycol ether, the glycol ether acetate, or a combination of the glycol ether and the glycol ether acetate.

12. The method of claim 5 wherein the printing ink comprises:
   about 7.5 weight percent water;
   about 44 weight percent N-methyl-2-pyrrolidone; and
   about 45 weight percent dipropylene glycol methyl ether acetate.

13. The method of claim 5 wherein the printing ink comprises:
   about 7.5 weight percent water;
   about 42.5 weight percent N-methyl-2-pyrrolidone; and
   about 20 weight percent dipropylene glycol methyl ether acetate.

14. A method of printing the ink produced in accordance with the method of claim 1, the method comprising:
   placing the ink in a printer cartridge of an ink jet printer;
   jetting droplets of the ink from the ink jet printer onto a recording medium.

15. The method of claim 14 wherein the recording medium comprises hydrophobic material, the ink droplets jetted onto the hydrophobic material, at least a portion of each ink droplet chemically bonding to the hydrophobic material, and each ink droplet being dry within about one second or less after being jetted onto the hydrophobic material.

16. A method of printing the ink produced in accordance with the method of claim 5, the method comprising:
   placing the ink in a printer cartridge of an ink jet printer; and
   jetting droplets of the ink from the ink jet printer onto a recording medium.

17. The method of claim 16 wherein the recording medium comprises hydrophobic material, the ink droplets jetted onto the hydrophobic material, at least a portion of each ink droplet chemically bonding to the hydrophobic material, and each ink droplet being dry within about one second or less after being jetted onto the hydrophobic material.

18. A method of forming a thermal ink jet printing ink, the method comprising:
   combining a nitrogen-containing cyclic organic compound and a colorant; and
   homogeneously blending the nitrogen-containing cyclic organic compound and the colorant to form the thermal ink jet printing ink, the thermal ink jet printing ink free of water.

19. The method of claim 18 wherein the printing ink consists essentially of the nitrogen-containing cyclic organic compound and the colorant, the ink capable of being jetted by a thermal ink jet printer.

20. The method of claim 18 wherein the printing ink is capable of being jetted by a thermal ink jet printer.

21. The method of claim 18 wherein the printing ink is capable of being jetted by a thermal ink jet printer as a continuous stream of ink drops onto a recording medium to form a printed image having a continuous printed area of about six square feet.

22. The method of claim 18 wherein the nitrogen-containing cyclic organic compound is selected from the group consisting of an imidazolidinone, a pyrrolidone, a caprolactam, and any of these in any combination.

23. The method of claim 18 wherein the nitrogen-containing cyclic organic compound is selected from the group consisting of N-methyl-2-pyrrolidone, 2-pyrrolidone, N-cyclohexylpyrrolidone, 1-(2-hydroxyethyl)-2-pyrrolidone, N-vinyl-2-pyrrolidone, N-octyl-2-pyrrolidone, N-dodecyl-2-pyrrolidone, and any of these in any combination.

24. The method of claim 18 wherein the colorant is a dye, a pigment, or any combination of these.

25. The method of claim 18 wherein the colorant is a dye, the dye being soluble in the nitrogen-containing cyclic organic compound.

26. The method of claim 18 wherein the concentration of the nitrogen-containing cyclic organic compound in the ink is from about 10 weight percent to about 99.5 weight percent, based on the total weight of the ink.

27. The method of claim 18, the method further comprising:
    combining glycol ether or glycol ether acetate with the nitrogen-containing cyclic organic compound and the colorant; and
    homogeneously blending the nitrogen-containing cyclic organic compound, the glycol ether or the glycol ether acetate, and the colorant to form the printing ink.

28. The method of claim 27 wherein:
    the concentration of the glycol ether in the ink is from 0 weight percent to about 80 weight percent, based on the total weight of the ink; and
    the concentration of the glycol ether acetate in the ink is from 0 weight percent to about 80 weight percent, based on the total weight of the ink.

29. The method of claim 27 wherein the printing ink is capable of being jetted by a thermal ink jet printer.

30. A method of printing the ink produced in accordance with the method of claim 18, the method comprising:
    placing the ink in a printer cartridge of an ink jet printer;
    jetting droplets of the ink from the ink jet printer onto a recording medium.

31. The method of claim 30 wherein the recording medium comprises hydrophobic material, the ink droplets jetted onto the hydrophobic material, at least a portion of each ink droplet chemically bonding to the hydrophobic material, and each ink droplet being dry within about one second or less.

32. A printing ink, the printing ink comprising:
    water, the concentration of water in the printing ink ranging up to about 10 weight percent, based on the total weight of the printing ink;
    a nitrogen-containing cyclic organic compound; and
    a colorant.

33. The printing ink of claim 32 wherein the nitrogen-containing cyclic organic compound is selected from the group consisting of an imidazolidinone, a pyrrolidone, a caprolactam, and any of these in any combination.

34. The printing ink of claim 32 wherein the nitrogen-containing cyclic organic compound is selected from the group consisting of N-methyl-2-pyrrolidone, 2-pyrrolidone, N-cyclohexylpyrrolidone, 1-(2-hydroxyethyl)-2-pyrrolidone, N-vinyl-2-pyrrolidone, N-octyl-2-pyrrolidone, N-dodecyl-2-pyrrolidone, and any of these in any combination.

35. The printing ink of claim 32 wherein the concentration of the nitrogen-containing cyclic organic compound in the ink is from about 10 weight percent to about 99.5 weight percent, based on the total weight of the ink.

36. The printing ink of claim 32, the printing ink further comprising glycol ether or glycol ether acetate.

37. The printing ink of claim 36 wherein:
    the concentration of the glycol ether in the ink is from 0 weight percent to about 80 weight percent, based on the total weight of the ink; and
    the concentration of the glycol ether acetate in the ink is from 0 weight percent to about 80 weight percent, based on the total weight of the ink.

38. The printing ink of claim 32 wherein the nitrogen-containing cyclic organic compound is a caprolactam.

39. The printing ink of claim 32 wherein the nitrogen-containing cyclic organic compound is selected from the group consisting of N-cyclohexylpyrrolidone, 1-(2-hydroxyethyl)-2-pyrrolidone, N-vinyl-2-pyrrolidone, N-octyl-2-pyrrolidone, N-dodecyl-2-pyrrolidone, or any of these in any combination.

40. The printing ink of claim 32 wherein the printing ink consists essentially of the water, the nitrogen-containing cyclic organic compound, and the colorant.

41. The printing ink of claim 32 wherein the concentration of water in the printing ink ranges up to about 7.5 weight percent, based on the total weight of the printing ink.

42. The printing ink of claim 36 wherein the printing ink consists essentially of:
    the water, the nitrogen-containing cyclic organic compound, and the colorant; and
    the glycol ether, the glycol ether acetate, or a combination of the glycol ether and the glycol ether acetate.

43. The printing ink of claim 36 wherein the printing ink comprises:
    about 7.5 weight percent water;
    about 44 weight percent N-methyl-2-pyrrolidone; and
    about 44 weight percent dipropylene glycol methyl ether acetate.

44. The printing ink of claim 36 wherein the printing ink comprises:
    about 7.5 weight percent water;
    about 42.5 weight percent N-methyl-2-pyrrolidone; and
    about 20 weight percent dipropylene glycol methyl ether acetate.

45. The method of claim 32 wherein the colorant comprises a pigment.

46. A method of printing the printing ink of claim 32, the method comprising:
    placing the ink in a printer cartridge of an ink jet printer;
    jetting droplets of the ink from the ink jet printer onto a recording medium.

47. The method of claim 46 wherein the recording medium comprises hydrophobic material, the ink droplets jetted onto the hydrophobic material, at least a portion of each ink droplet chemically bonding to the hydrophobic material, and each ink droplet being dry within about one second or less after being jetted onto the hydrophobic material.

48. A method of printing the printing ink of claim 30, the method comprising:

placing the ink in a printer cartridge of an ink jet printer; and jetting droplets of the ink from the ink jet printer onto a recording medium.

49. The method of claim 48 wherein the recording medium comprises hydrophobic material, the ink droplets jetted onto the hydrophobic material, at least a portion of each ink droplet chemically bonding to the hydrophobic material, and each ink droplet being dry within about one second or less after being jetted onto the hydrophobic material.

50. A thermal ink jet printing ink, the thermal ink jet printing ink comprising:

a nitrogen-containing cyclic organic compound; and a colorant, the thermal ink jet printing ink free of water.

51. The printing ink of claim 50 wherein the printing ink consists essentially of the nitrogen-containing cyclic organic compound and the colorant, the ink capable of being jetted by a thermal ink jet printer.

52. The printing ink of claim 50 wherein the printing ink is capable of being jetted by a thermal ink jet printer.

53. The printing ink of claim 50 wherein the printing ink is capable of being jetted by a thermal ink jet printer as a continuous stream of ink drops onto a recording medium to form a printed image having a continuous printed area of about six square feet.

54. The printing ink of claim 50 wherein the nitrogen-containing cyclic organic compound is selected from the group consisting of an imidazolidinone, a pyrrolidone, a caprolactam, and any of these in any combination.

55. The printing ink of claim 50 wherein the nitrogen-containing cyclic organic compound is selected from the group consisting of N-methyl-2-pyrrolidone, 2-pyrrolidone, N-cyclohexylpyrrolidone, 1-(2-hydroxyethyl)-2-pyrrolidone, N-vinyl-2-pyrrolidone, N-octyl-2- pyrrolidone, N-dodecyl-2-pyrrolidone, and any of these in any combination.

56. The printing ink of claim 50 wherein the colorant is a dye, a pigment, or any combination of these.

57. The printing ink of claim 50 wherein the colorant is a dye, the dye being soluble in the nitrogen-containing cyclic organic compound.

58. The printing ink of claim 50 wherein the concentration of the nitrogen-containing cyclic organic compound in the ink is from about 10 weight percent to about 99.5 weight percent, based on the total weight of the ink.

59. The printing ink of claim 50, the printing ink further comprising glycol ether or glycol ether acetate.

60. The printing ink of claim 59 wherein:

the concentration of the glycol ether in the ink is from 0 weight percent to about 80 weight percent, based on the total weight of the ink; and the concentration of the glycol ether acetate in the ink is from 0 weight percent to about 80 weight percent, based on the total weight of the ink.

61. The printing ink of claim 59 wherein the printing ink is capable of being jetted by a thermal ink jet printer.

62. A method of printing the printing ink of claim 50, the method comprising:

placing the ink in a printer cartridge of an ink jet printer;

jetting droplets of the ink from the ink jet printer onto a recording medium.

63. The method of claim 62 wherein the recording medium comprises hydrophobic material, the ink droplets jetted onto the hydrophobic material, at least a portion of each ink droplet chemically bonding to the hydrophobic material, and each ink droplet being dry within about one second or less.

64. A method of printing the ink produced in accordance with the method of claim 27, the method comprising:

placing the ink in a printer cartridge of an ink jet printer; and jetting droplets of the ink from the ink jet printer onto a recording medium.

65. The method of claim 64 wherein the recording medium comprises hydrophobic material, the ink droplets jetted onto the hydrophobic material, at least a portion of each ink droplet chemically bonding to the hydrophobic material, and each ink droplet being dry within about one second or less after being jetted onto the hydrophobic material.

66. The method of claim 1 wherein the colorant comprises a pigment.

* * * * *